Jan. 9, 1940.   A. D. ROBBINS   2,186,556
TORQUE CONVERTER
Filed March 25, 1936   2 Sheets-Sheet 1

INVENTOR
Azor D Robbins

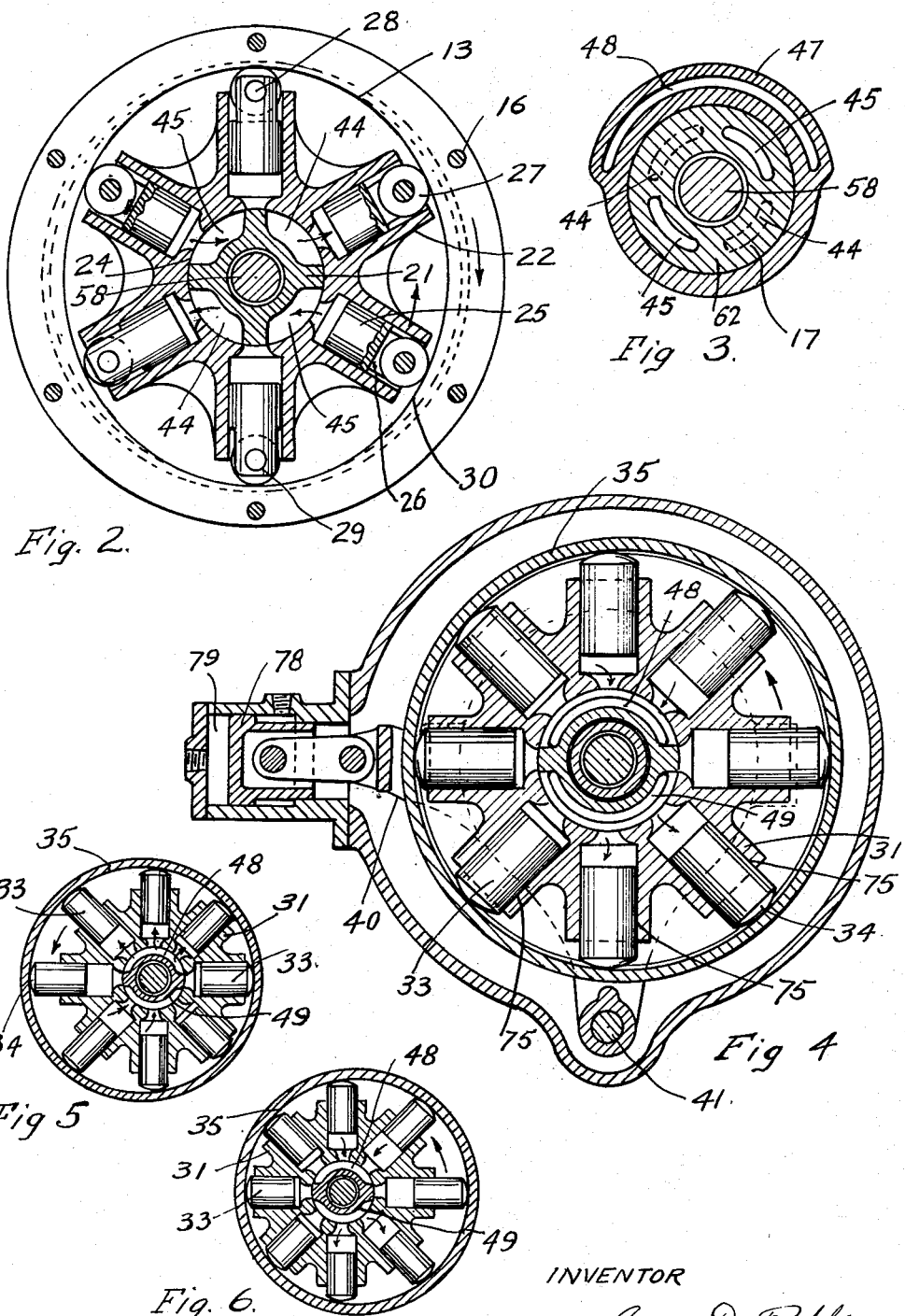
Jan. 9, 1940. A. D. ROBBINS 2,186,556
TORQUE CONVERTER
Filed March 25, 1936 — 2 Sheets-Sheet 2
INVENTOR
Azor D Robbins Patented Jan. 9, 1940

2,186,556

UNITED STATES PATENT OFFICE 2,186,556

TORQUE CONVERTER

Azor D. Robbins, Highland Park, N. J.

Application March 25, 1936, Serial No. 70,899

4 Claims. (Cl. 60—53)

This invention relates to torque converters and the device is intended for use with a prime mover, such as an automobile engine, whereby the torque of the prime mover, after being transmitted through the torque converter, may be changed to a greater torque at slow speed, or a low torque at higher speed.

The objects of the invention are to provide a torque converter in which the efficiency is relatively high, as compared with previous constructions, and in which the torque or speed of the output shaft may be changed while power is being transmitted.

I attain these and other objects as will be apparent as the invention is described in detail and in connection with the acocmpanying drawings in which:

Fig. 2 is a view in section on line 2—2 of Fig. 1.

Fig. 3 is a view in section on line 3—3 of Fig. 1.

Figure 1:
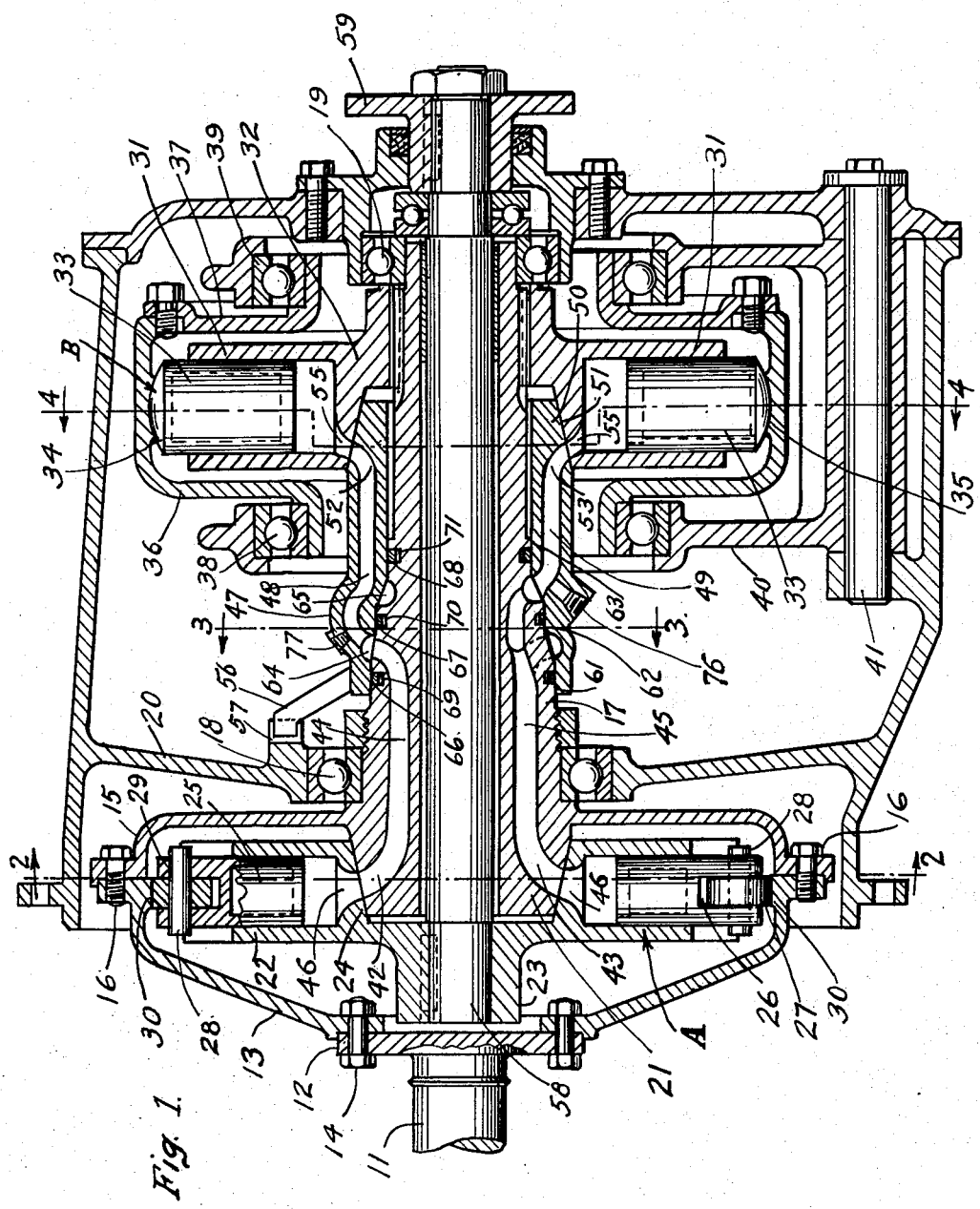
Figure 1 is a view in section on a vertical plane.

Fig. 4 is a section on line 4—4 of Fig. 1. Figs. 5 and 6 are also sections at line 4—4 to illustrate various positions of parts in operation.

Similar reference characters refer to similar parts throughout the several views.

Referring to Fig. 1, a driving shaft is indicated at 11 to which power may be supplied by any suitable source. The shaft has a flange 12 to which a casing cover 13 is attached by bolts 14. A casing 15 is secured by bolts 16 to the cover 13. The casing supports a hollow shaft 17 coaxial with the driving shaft 11 and the casing and shafts are adapted to rotate together, being journaled on the bearings 18 and 19 supported in the housing 20.

The shaft 17 has a conical projection 21 extending within the casing 15 and supporting a group of cylinders 22 formed on a hub 23. The hub has a conical seat 24 formed to seat on the projection 21. The cylinders 22 are fitted with pistons 25 adapted to force fluid toward the center or hub 23. The pistons have slots 26 formed at their outer ends to receive rollers 27 journaled on pins 28 which fit into holes 29 in the forked ends of the pistons. The rollers engage an internal cam 30 within the casing 13. As seen in Fig. 2, the form of the cam is substantially oval and, in consequence, when the casing is rotated in relation to the cylinders, the rollers 27 will be caused to move radially and reciprocate the pistons twice for each revolution of the casing. The cylinders, may under certain conditions, hereinafter described, form a pump unit which for future reference may be designated as unit A.

The shaft 17 carries a second group of cylinders 31, arranged on a hub 32 which may be keyed to the shaft 17. A second series of pistons 33 are fitted to the cylinders 31. The pistons 33 have spherical ends 34 adapted to engage an annular track 35 mounted on flanges 36 and 37 which are journaled in bearings 38 and 39. The bearings 38 and 39 are carried in a cradle 40 pivotally mounted in the housing 20 by means of the pin 41.

The cradle 40 may be oscillated by suitable means and may be positioned to hold the track 35 concentric with the shaft 17 or the track may be held eccentric to the shaft on one side or the other. It will be seen that rotation of the shaft 17 and cylinders 31 will tend to force the pistons 33, by centrifugal force, against the track 35 and the friction of the engaging ends 34, against the track, will tend to rotate the track and flanges 36 and 37 in the anti-friction bearings 38 and 39. If the track is held eccentric to the shaft 17, as shown in Fig. 2, rotation of the cylinders 31 will cause the pistons 33 to be reciprocated and when the track is held concentric to the shaft 17, the cylinders 31 may be rotated without reciprocating said pistons. The cylinders 31, pistons 33 and track 35 may, under certain conditions hereinafter described, form a pump unit which may be designated as unit B.

The shaft 17 is formed with ports 42 and 43 connecting with passages 44 and 45 in said shaft as the track 13 causes the pistons 25 to reciprocate twice for each revolution of said track in relation to said cylinders, two each of passages 44 and 45 are required to convey fluid to or from the cylinders 22. The cylinders 22 have inwardly extending openings 46 adapted to cooperate with the ports 42 and 43. As the cylinders 22 are rotated about the conical projection 21, the openings 46 will communicate with the ports 42 or 43 and permit fluid to flow to or from the cylinders.

The shaft 17 carries a sleeve 47 in which are passages 48 and 49. The sleeve has a conical end 50 adapted to form a close running fit with a conical seat 51 in the hub 32. The passages 48 and 49 terminate in ports 52 and 53 which communicate with openings 55 in the cylinders 31. The sleeve 47 has an arm 56 which extends into a slot 57 in the casing 20. The arm prevents the sleeve 47 from turning when the shaft 17 is rotated.

The hub 23 of the cylinders 22 is keyed to a shaft 58 extending through the hollow shaft 17. The shaft 58 terminates in a flange 59 to which a driven shaft (not shown) may be attached.

The sleeve 47 has surfaces at 61, 62 and 63 adapted to fit annular surfaces on the shaft 17. Between the surfaces 61 and 62 is an annular recess 64 in the sleeve 47. The recess communicates with the passage 48 in the sleeve and said recess provides an outlet or inlet to the passage 44 in the shaft 17. Between the surfaces 62 and 63 an annular recess 65 is formed in the shaft 17. The recess 65 forms a connecting channel between the passages 45 and 49 in the shaft and sleeve, respectively. Therefore in any position of rotation of the shaft 17 there will be a continuous connection between the passages 44 and 48 also between the passages 45 and 49.

Rings 66, 67 and 68 are fitted in grooves 69, 70 and 71 in the shaft 17. The rings are of the expanding type well known as piston rings, and serve to seal the surfaces 61, 62 and 63 against loss of the fluid with which the cylinders and passages may be filled. It will be seen that the surfaces at 61, 62 and 63 are of different diameters and when fluid in either annular recess 64 or 65 is under hydrostatic pressure, a relative axial thrust will be set up between the shaft 17 and the sleeve 47. The shaft becoming, in effect, a differential piston, due to the difference in diameters of surfaces 61 and 62 or 62 and 63. Axial thrust due to the above named cause will therefore thrust the shaft 17 toward the seat 24 in the hub 23 and the reacting thrust against the sleeve will thrust it toward the seat 51 on the hub 32.

Due to hydrostatic pressure in any of the ports or openings 46 or 55, there will be an axial thrust tending to force the conical surfaces 24 or 50 out of the seats 51 or 24. By choosing a suitable angle for the cones and making the surfaces 61, 62 and 63 of suitable relative diameter, the thrust of the cones against their relative seats may be regulated in a manner which will insure keeping the cones and seats together and forming a relatively oil tight running joint between said cones and seats. In order to permit correct functioning of the conical surfaces and seats, the hub 32 is preferably made axially movable on shaft 17, so axial thrust from sleeve 47 may be conveyed through hub 32 bearing 19, shaft 58 and draw hub 23 against conical member 21.

The action of the device may be understood by examining various operating conditions. For example, assuming the track 35 to be held concentric with the shaft 17, in this position rotation of the cylinders 31 will cause no reciprocation of the pistons 33 and there will be no pumping action in unit B. If the casing 13 is rotated under these conditions, fluid in the cylinders 22 will be under pressure due to cam 30 forcing the pistons 25 inwardly. There is, however, no escape for the fluid from unit A, the pistons therefore cannot reciprocate, and the cylinders 22 and shaft 58 will be compelled to rotate with the casing 13 and at the same speed.

The track 35 may be moved to an eccentric position where the stroke of the pistons 33 will cause unit B to equal pump unit A in capacity per revolution. In this position rotation of the casing 13 will not cause the cylinders of pump unit A to rotate but the pistons 25 will reciprocate and pump fluid through passages 45 and 49 to unit B and from unit B the fluid will return to unit A through passages 48 and 44, assuming the direction of rotation as indicated by the arrows in Figs. 2 and 4, the amount of fluid pumped by the pistons 25 into unit B being exactly equal to the amount of fluid pumped by pistons 33 of unit B into unit A, whereby member 23 will remain stationary.

Fig. 4 shows the track 35 in a position half way between those mentioned and in which the unit B is about half the capacity of unit A. In this position rotation of the casing 13 will cause pressure on the pistons 25, as before, and fluid will be forced to unit B. But, as unit B has now only half the capacity of unit A, the cylinders 22 of unit A will turn at half the speed of the casing 13. It will be noted that pressure from unit A will force fluid to the lower pistons of unit B and forcing said pistons toward track 35. The track at this point presents an angular surface to the end of the pistons 33 and the sides of the pistons will press against the walls of the cylinders at 75, tending to turn said cylinders in the same direction as the casing 13. It will therefore be seen that when fluid is forced from unit A to pump B, and pump B is set at less capacity than unit A, pump B will become a motor, regenerating power and adding it to the torque of the driving member and thereby increasing the pressure of the fluid in the compression side of the system. Any intermediate position of track 35 between those thus far shown may be used and any degree of speed from zero to direct drive may be obtained and the increase of torque in the driven member 22 is substantially in proportion to the decrease in speed.

Another condition is shown in Fig. 5 with track 35 displaced to the opposite side as compared to Fig. 4. In this position fluid in lower cylinders of unit B is forced back through passages 49 and 45 to unit A and will turn cylinders 22 of the driven member at a greater speed than the driving member 13.

Fig. 6 shows a condition in which the track 35 is displaced to give a greater capacity to the unit B than the capacity of unit A. In this position fluid exhausted from unit B will cause pressure in passages 48 and 44 therefore causing unit A to turn the driven member 23 in the opposite direction to the driving member.

In all positions where the axis of the track 35 is eccentric to the shafts, the cradle 40 serves as a reaction member against which unit B, when operating as a motor, will react to increase torque or give reverse action.

Any loss of fluid, during operation, through leakage, may be replaced through inlets 76 or 77 in sleeve 47. Into said inlets fluid may be forced by a pump, which may be of any character and is not shown.

It will thus be seen that I have provided a relatively simple device capable of transmitting power in either direction at various speeds including faster than the driving member and at increased torque in the lower speeds. It will also be seen that provision has been made to guard against undue leakage and relatively high pressures may be used.

To oscillate the cradle and thereby change the conditions of drive I prefer to use a fluid operated piston 78 operating in a cylinder 79. Any suitable pump may be used to force fluid to said cylinder and said pump may be driven from the prime mover or the driven member.

It is intended that the above description and drawings shall be considered in an illustrative and not in a limiting sense, and many changes may be made without departing from the spirit of the invention as set forth in the following claims.

What I claim is:

1. A power transmitting device comprising, in combination, a housing, a rotatable hollow shaft journaled in said housing, an internal cam track rotatably connected to said shaft, a series of radial cylinders united on a hub and in the plane of said track, a driven shaft rotatably mounted in said hollow shaft, said hub being keyed to said driven shaft, a ported projection on said hollow shaft extending within said hub, said cylinders having openings adapted to communicate with the ports in said projection, a second series of cylinders united on a hub and rotatively connected to said hollow shaft, pistons in said second series of cylinders, a laterally adjustable track movably mounted in said housing and engaging said second series of pistons, a nonrotatable sleeve supported by said hollow shaft and having a ported projection extending within said second series of cylinders, said second series of cylinders having openings adapted to communicate with the ports of said sleeve, said sleeve and said hollow shaft having passages adapted to convey fluid from one series of cylinders to the other and a running joint between said sleeve and said shaft having recesses to convey fluid from said shaft to said sleeve.

2. A power transmitting device as claimed in claim 1, in which the running joint comprises cylindrical surfaces at each side of said recesses and said surfaces being of different diameters to comprise a piston whereby pressure of the fluid acts to force the ported surface of said sleeve against the hub of said second series of cylinders.

3. A power transmitting device comprising, in combination, a rotatable driving shaft, an internal cam track rotatably connected to said shaft, a driven shaft, a series of cylinders united on a hub and keyed to said driven shaft, pistons in said cylinders adapted to be operated by said cam track, a ported conical projection on said driving shaft extending within a conical seat in said hub, said cylinders having openings adapted to communicate with the ports in said projection, a second series of cylinders united on a hub and rotatively connected to said driving shaft, pistons in said second series of cylinders, a laterally adjustable track movably mounted in said housing and engaging said second series of pistons, a nonrotatable sleeve supported by said driving shaft and having a ported conical end, the hub of said second series of cylinders having a conical seat adapted to receive the conical end of said sleeve, said second series of cylinders having openings adapted to communicate with ports in said sleeve, said sleeve and said driving shaft having passages adapted to convey fluid from one series of cylinders to the other, a running joint between said sleeve and said driving shaft, annular recesses in said sleeve and said shaft to convey fluid from said shaft to said sleeve, and said running joint comprising cylindrical surfaces of different diameters whereby the conical end of said sleeve is forced into the conical seat of said second series of cylinders.

4. A structure as claimed in claim 3 in which means is provided to communicate the thrust of said sleeve through said driven shaft to draw the first named hub against the conical projection of said driving shaft.

AZOR D. ROBBINS.